(12) United States Patent
Zweig et al.

(10) Patent No.: US 8,938,391 B2
(45) Date of Patent: Jan. 20, 2015

(54) DYNAMICALLY ADDING PERSONALIZATION FEATURES TO LANGUAGE MODELS FOR VOICE SEARCH

(75) Inventors: Geoffrey Zweig, Sammamish, WA (US); Shuangyu Chang, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 13/158,453

(22) Filed: Jun. 12, 2011

(65) Prior Publication Data
US 2012/0316877 A1 Dec. 13, 2012

(51) Int. Cl.
*G10L 15/04* (2013.01)
(52) U.S. Cl.
USPC .............. 704/251; 704/257; 704/255; 704/9
(58) Field of Classification Search
USPC ............ 704/1–10, 251, 255, 257, 270, 270.1, 704/231, 235
See application file for complete search history.

(56) References Cited

U.S. PATENT DOCUMENTS

| | | | |
|---|---|---|---|
| 6,314,399 B1 | 11/2001 | Deligne et al. | |
| 7,320,031 B2 | 1/2008 | Konig et al. | |
| 8,005,680 B2* | 8/2011 | Kommer | 704/275 |
| 8,352,277 B2* | 1/2013 | Bennett | 704/270.1 |
| 2009/0037175 A1 | 2/2009 | Wang et al. | |
| 2009/0106023 A1 | 4/2009 | Miki et al. | |
| 2010/0145694 A1 | 6/2010 | Ju et al. | |

OTHER PUBLICATIONS

Gao, et al., "The Use of Clustering Techniques for Language Modeling—Application to Asian Languages", Retrieved at <<http://citeseer.ist.psu.edu/viewdoc/download;jsessionid=CA5A16E2FDD15E36B8B0FE1969F450B2?doi=10.1.1.18.5452&rep=rep1&type=pdf>>, Computational Linguistics and Chinese Language Processing, vol. 6 No. 1, Retrieved Date: Apr. 8, 2011, pp. 1-28.

Blasig, Reinhard, "Combination of Words and Word Categories in Varigram Histories", Retrieved at <<http:// ieeexplore.ieee.org/stamp/stamp.jsp?tp=&arnumber=758179>>, Proceedings of IEEE International Conference on Acoustics, Speech, and Signal Processing, vol. 1, 1999, pp. 529-532.

Niesler, et al., "Comparison of Part-Of-Speech and Automatically Derived Category-Based Language Models for Speech Recognition", Retrieved at <<http://ieeexplore.ieee.org/stamp/stamp.jsp?tp=&arnumber=674396>>, Proceedings of IEEE International Conference on Acoustics, Speech, and Signal Processing, vol. 1, 1998, pp. 177-180.

Chen, Stanley F., "Performance Prediction for Exponential Language Models", Retrieved at <<http://citeseerx.ist.psu.edu/viewdoc/download?doi=10.1.1.153.3026&rep=rep1&type=pdf>>, Proceedings of Human Language Technologies: The Annual Conference of the North American Chapter of the Association for Computational Linguistics, 2009.

(Continued)

*Primary Examiner* — Huyen X. Vo
(74) *Attorney, Agent, or Firm* — Sandy Swain; Doug Barker; Micky Minhas

(57) ABSTRACT

A dynamic exponential, feature-based, language model is continually adjusted per utterance by a user, based on the user's usage history. This adjustment of the model is done incrementally per user, over a large number of users, each with a unique history. The user history can include previously recognized utterances, text queries, and other user inputs. The history data for a user is processed to derive features. These features are then added into the language model dynamically for that user.

20 Claims, 5 Drawing Sheets

(56) References Cited

OTHER PUBLICATIONS

Chen, Stanley F., "Shrinking Exponential Language Models", Retrieved at <<http://citeseer.ist.psu.edu/viewdoc/download;jsessionid=0053741D972C4AD4C20FC474931B73A7?doi=10.1.1.153.4108&rep=rep1&type=pdf>>, Proceedings of Human Language Technologies: The Annual Conference of the North American Chapter of the Association for Computational Linguistics 2009, pp. 9.

Chen, et al., "Scaling Shrinkage-based Language Models", Retrieved at http://ieeexplore.ieee.org/stamp/stamp.jsp?tp=&arnumber=5373380>>, IEEE Workshop on utomatic Speech Recognition & Understanding, 2009, pp. 299-304.

Brown, et al., "Class-based n-gram Models of Natural Language", Retrieved at <<http://acl.ldc.upenn.edu/J/J92/J92-4003.pdf, Computational Linguistics, vol. 18, No. 4, 1992, pp. 14.

Chen, et al., "Enhanced Word Classing for Model M", Retrieved at <<http://www.ee.columbia.edu/~stanchen/papers/e033q2.pdf>>, Interspeech, 2010, pp. 4.

Acero, et al., "Live Search for Mobile: Web Services by Voice on the Cellphone", Retrieved at <<http://ieeexplore.ieee.org/stamp/stamp.jsp?tp=&arnumber=4518845>>, Proceedings of International Conference on Acoustics, Speech, and Signal Processing—ICASSP, 2007, pp. 5256-5259.

Pietra, et al., "Inducing Features of Random Fields", Retrieved at <<http://ieeexplore.ieee.org/stamp/stamp.jsp?tp=&arnumber=588021>>, Proceedings of IEEE Tansactions on Pattern Analysis and Machine Intelligence, vol. 19 No. 4, Apr. 1997, pp. 380-393.

Chelba, et al., "Adaptation of Maximum Entropy Capitalizer: Little Data Can Help a Lot", Retrieved at <<http://research.microsoft.com/pubs/76885/2004-chelba-emnlp.pdf>>, Computer Speech & Language,EMNLP, vol. 20 No. 4, 2004, pp. 8.

Sung, et al., "Maximum Conditional Likelihood Linear Regression and Maximum a Posteriori for Hidden Conditional Random Fields Speaker Adaptation", Retrieved at <<http://ieeexplore.ieee.org/stamp/stamp.jsp?tp=&arnumber=4518604>>, Proceedings of IEEE International Conference on Acoustics, Speech and Signal Processing2008, pp. 4293-4296.

Reidmiller, Martin, "Rprop—Description and Implementation Details", Retrieved at <<http://citeseerx.ist.psu.edu/viewdoc/download?doi=10.1.1.21.3428&rep=rep1type=pdf>>, Jan. 1994, pp. 2.

Darroch, et al., "Generalized Iterative Scaling for Log-linear Models", Retrieved at http://www.cs.nyu.edu/~roweis/csc412-2006/extras/gis.pdf>>, The Annals of Mathematical Statistics, vol. 43 No. 5, Oct. 1972, pp. 12.

Bolanos, et al., "Multi-scale Personalization for Voice Search Applications", Retrieved at <<http://www.aclweb.org/anthology/N/N09/N09-2026.pdf>>, Proceedings of Human Language Technologies: The Annual Conference of the North American Chapter of the Association for Computational Linguistics, Jun. 2009, pp. 101-104.

Zweig, et al., "Structured Models for Joint Decoding of Repeated Utterances", Retrieved at <<http://citeseerx.ist.psu.edu/viewdoc/download?doi=10.1.1.149.9062&rep=rep1&type=pdf>>, 2008, pp. 4.

Zweig, Geoffrey, "New Methods for the Analysis of Repeated Utterances", Retrieved at <<http://research.microsoft.com/pubs/81238/wls4m_repeats.pdf>>, Proceedings of 10th Annual Conference of the International Speech Communication Association—Interspeech, Sep. 6-10, 2009, pp. 4.

Daume, III, Hal, "Frustratingly Easy Domain Adaptation", Retrieved at <<http://acl.ldc.upenn.edu/P/P07/P07-1033.pdf>>, Proceedings of the 45th Annual Meeting of the Association of Computational Linguistics, Jun. 2007, pp. 256-263.

Stolcke, Andreas, "Entropy-based Pruning of Backoff Language Models", Retrieved at <<http://arxiv.org/PS_cache/cs/pdf/0006/0006025v1.pdf, News Transcription and Understanding Workshop—DARPA Broadcast, 1998, pp. 5.

* cited by examiner

DYNAMICALLY ADDING PERSONALIZATION FEATURES TO LANGUAGE MODELS FOR VOICE SEARCH

BACKGROUND

Speech recognition generally involves two kinds of pattern recognition. The first kind of pattern recognition using an acoustic model to identify sounds and sequences of sounds that may be words or parts of words. The second kind of pattern recognition uses a language model to identify sequences of words. The language model provides a linguistically based score representing the probability of a word given a word history. An n-gram model means the word history is n words long. Both models typically are probabilistic and are generated from a training set of valid utterances. Other than this similarity, however, both of these models typically are designed and implemented, and generally treated, as independent from each other, except they are used in an interleaved fashion to recognize words in an utterance. Such techniques are described generally in F. Jelinek, *Statistical Methods for Speech Recognition*, MIT Press, 1997.

There are several different classes of language models. One class of language models is exponential language models, such as "model M" described in "Performance Prediction for Exponential Language Models," by Stanley Chen, in the proceedings of *NAACL-HLT*, 2009. In an exponential language model, word n-gram probabilities are modeled with a log-linear model, and word-class information is used in the definition of the features. Assuming an n-gram model on words w, and a lambda λ for each word history in the training data, subject to length and frequency restrictions, the form of the basic exponential language model is (Equation (0)):

$$P(w_i \mid w_{i-n+1} \ldots w_{i-1}) = \frac{\exp(\lambda_{w_{i-n+1} \ldots w_{i-1} w_i} + \ldots + \lambda_{w_{i-1} w_i} + \lambda_{w_i})}{\sum_{w'} \exp(\lambda_{w_{i-n+1} \ldots w_{i-1} w'} + \ldots + \lambda_{w_{i-1} w'} + \lambda_{w'})}.$$

In this model, the presence of an n-gram sequence is a feature, and there is a lambda for each feature.

Typically, one or more fixed language models are built and used unchanged for an entire data set, for both training and classification. If a fixed set of language models is used, interpolation is performed on one or more of the large language models in the set. To extend such a model to accommodate information specific to a user, it is common to interpolate a user-specific n-gram language model with a generic n-gram language model. However, this solution is computationally inefficient for large numbers of users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A dynamic exponential, feature-based, language model is continually adjusted per utterance by a user, based on the user's usage history. This adjustment of the model is done incrementally per user, over a large number of users, each with a unique history. The user history can include previously recognized utterances, text queries, and other user inputs. The history data for a user is processed to derive features. These features are then added into the language model dynamically for that user.

Such a system can be embodied, for example, as a computer system or computing machine, a computer implemented process, or an article of manufacture that includes storage and instructions on the storage that are for a computer. The system stores data defining an exponential language model and data defining user history.

Accordingly, in one aspect, personalization features are defined, from the user history, having corresponding features in the language model. An input to the language model is processed by using the features in the language model and the personalization features.

In various embodiments, the user history is continually updated according to user activity. Personalization features of a same length, such as all one word features, can have a same weight. In other words, the weights are tied together for each set of n-gram weights. The personalization features can include word based features including words from the user history. The personalization features can include class based features including classes of words from the user history. The personalization features can include features with both words and class information. The personalization features can include information derived from a locality of the user and words associated with the locality.

In another aspect, training an exponential language model involves receiving a set of words for training the language model and sorting the n-grams of words. The words are applied to the model and parameters of the model are adjusted according to outputs of the model. Adjusting the parameters of the model includes computing a normalization constant, wherein the computation of the normalization constant includes a component for unigrams which is computed once per class, and a higher order component computed on demand for each input.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which personalization of a language model can be implemented.

Figure 1:
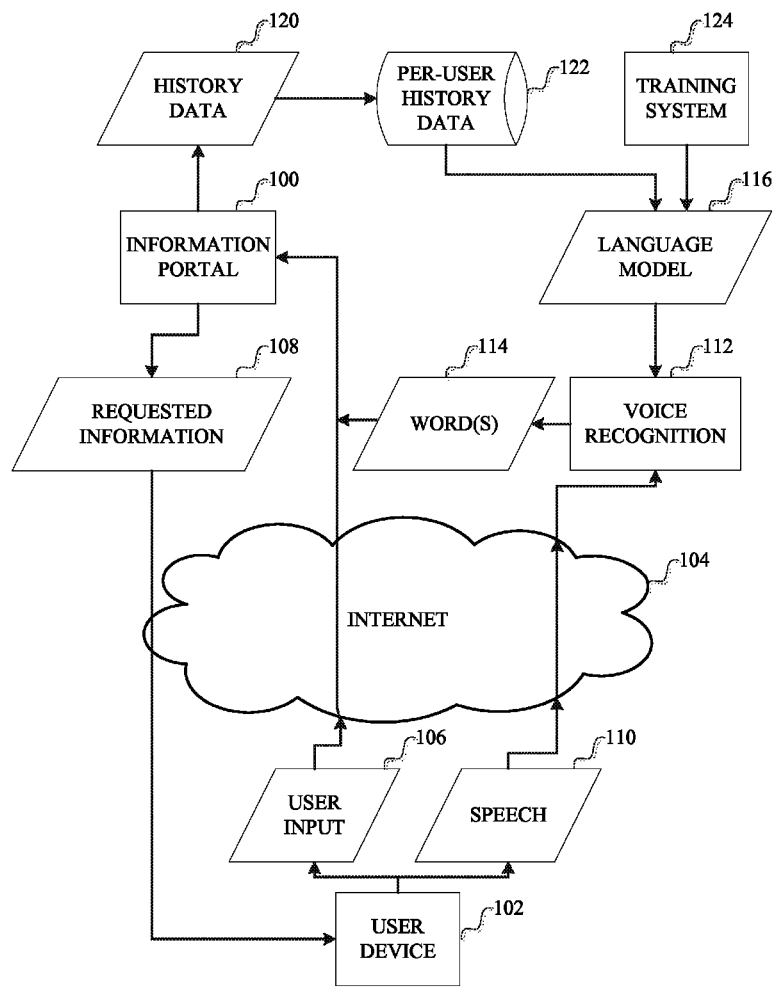
FIG. 1 is a data flow diagram illustrating an example environment in which voice recognition can be used.

Referring to FIG. 1, a search engine or information portal 100 provides a way for many users to access information and/or services from user devices 102 over a computer network 104 such as the internet. Example user devices include mobile device, mobile phones, handheld computers, laptop computers, notebook computers, desktop computers, and the like. The information portal 100 typically is supported by one or more server computers (not shown), with a primary address that is used to access the service over the network, but which redirects communication and traffic to a server computer that works with the user device 102 during a communication session.

The interaction between the user device 102 and the information portal 100 involves the user device sending user input 106 to the information portal 100. The user input can be any kind of data that is indicative of information requested by the user from the information portal 100, such as a resource identifier (e.g., a uniform resource locator (URL)), query terms, form data and the like. The information portal 100 responds to the request with the requested information 108, which can be search results, a requested document, or other information.

The user input, in some cases, includes speech 110. Speech is processed by a voice processing system 112, to provide one or more recognized words 114. The recognized words also can be used by the information portal 100 to provide information. For example, the recognized words can be search terms, a URL, form data and the like.

In many information portals, information about the user input and information requested are stored as history data 120. For each user, a history data file can be stored in storage 122. The history data 120 typically is in a simple text format or in a markup language format, and includes several days, if not months or even years, of information.

The voice processing system uses a language model 116 to help recognize speech, which provides information about what strings of words can be validly recognized based on a training set of phrases and sentences, as described in more detail below. Such a model typically is developed once by a training system 124 using a large training set, and the same model is used for many users. The language model 116 is dynamically updated on a per-user, per-utterance basis with information from the user's history data 120, as will now be described in more detail.

The purpose of dynamically updating the model on a per-user, per-utterance basis is to improve recognition. For example, assume the user has recently accessed a web page describing the "Triple Door Lounge." If the user speaks the phrase "Call the Triple Door Lounge," then this phrase in the user's history will increase the probability that the phrase "Triple Dour Lounge" is recognized. How this is achieved will be described below.

Given this context, an example implementation of the language model-based voice recognition system will be described in more detail in connection with FIGS. 2-5.

Figure 2:
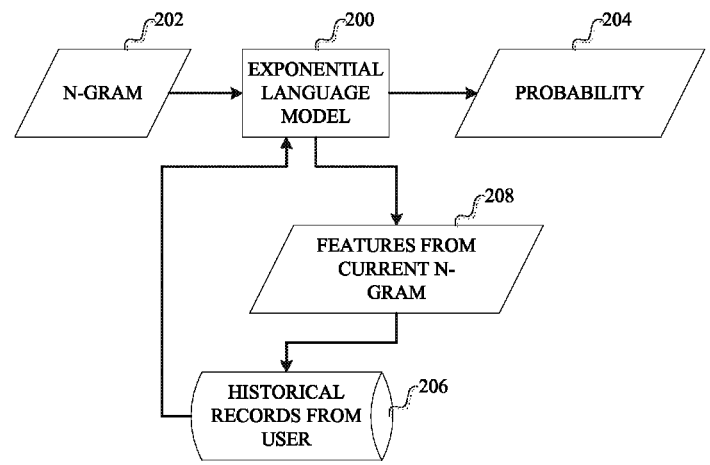
FIG. 2 is a data flow diagram illustrating an example implementation of personalizing a language model using user history.

In FIG. 2, a class-based exponential language model 200 is used for voice recognition. While there are many types of language models, an exponential language model, and in particular, a class-based exponential language model, is suitable for extension using user history data to improve recognition on a dynamic, per-user, per-utterance basis.

An exponential language model is generally described by equation (1) above. Such a language model can be factored and defined in another form, described below as equation (1)(b). In this model, each word is assigned to a single class, and n-gram probabilities are estimated as the product of a class part and a word part. In this case, the model is defined by Equation (1)(b):

$$P(w_i|w_{i-2}w_{i-1}) = P(c_i|c_{i-2}c_{i-1}, w_{i-2}w_{i-1})P(w_i|w_{i-2}w_{i-1}, c_i)$$

where (the following being Equations (2) and (3)):

$$P(w_i | w_{i-2}w_{i-1}, c_i) = \frac{\exp(\lambda_{w_{i-2}w_{i-1}w_i} + \lambda_{w_{i-1}w_i} + \lambda_{w_i})}{\sum_{w' \in c_i} \exp(\lambda_{w_{i-2}w_{i-1}w'} + \lambda_{w_{i-1}w'} + \lambda_{w'})}$$

$$P(c_i | c_{i-2}c_{i-1}, w_{i-2}w_{i-1}) = \frac{\exp(\lambda_{c_{i-2}c_{i-1}c_i} + \lambda_{c_{i-1}c_i} + \lambda_{c_i} + \lambda_{w_{i-2}w_{i-1}c_i} + \lambda_{w_{i-1}c_i})}{\sum_{c'} \exp(\lambda_{c_{i-2}c_{i-1}c'} + \lambda_{c_{i-1}c'} + \lambda_{c'} + \lambda_{w_{i-2}w_{i-1}c'} + \lambda_{w_{i-1}c'})}$$

where $c_i$ represents the class of word $w_i$ and $w' \in c_i$ ranges over the members of class $c_i$. A $\lambda$ parameter may be defined for each n-gram pattern in the training data, or restricted to commonly occurring patterns. Each word is mapped deterministically to a single class, ensuring the probabilistic validity of Eq'n (1)(b). The word classing may be done with a variety of methods, such as described in P. Brown, V. D. Pietra, P. deSouza, J. Lai, and R. Mercer, "Class based n-gram models of natural language," Computational Linguistics, vol. 18, no. 4, 1992.

These expressions represent the probability associated with an n-gram (e.g., "The Triple Door") that can be a combination of words or words and classes (e.g., "The Triple [noun]"). These probabilities are determined by training the model with a set of sentences and phrases from the language. The equations above assume that n is three, but the model can be extended to any number of n. Thus, given an n-gram as an input 202 in FIG. 2, a probability 204 is generated which represents a conditional probability of a word given preceding n−1 words (as the left-hand-side in of the equation (1)(b) above for n=3).

These probabilities can be modified dynamically on a per-user, per-utterance basis by utilizing the user history 206. In particular, given each feature in the language model 200, a binary personalization feature is derived from the history, for which the value is 1 if a suffix of words occurs in some n-gram in the user history. A weight for the feature is determined by the feature's length. There is one weight for unigrams, one for bigrams and so on. Separate weights can be provided for the class-based and word-based part of the model. The result, therefore, is a set of weights that can be applied to the probability associated with an n-gram in response to an input to the language model.

With a larger amount of data, and some additional data, more specific features could be added, such as "the user has uttered this word sequence in his current location" or "the user has requested The Triple Door" or "the user has requested Wal-Mart in Everett" as distinct features with different weights. Such additional data to define a more specific feature can include, but is not limited to, the user location related to the history data, the source of the history data (whether an utterance, a query, a click-through of a link, a data form, a contact in an address book, etc.), and other metadata stored with the history data.

Figure 3:
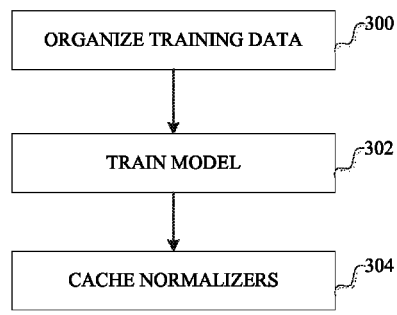
FIG. 3 is a flowchart describing an example implementation of a training process for a language model.

The generation of the language model through training will now be described in connection with FIGS. 3 and 4.

Such a language model is trained using a large dataset of sentences and phrases, which can include over one billion words. Training generally involves organizing the training data (300 in FIG. 3), so as to make computation more efficient. Next, the model is trained 302 by adjusting values of the model so as to minimize errors. Maximum entropy training is described, for example, in Berger et al., "A Maximum Entropy Approach to Natural Language Processing," Computational Linguistics 1996. Normalizers used in the training process can be cached 304 upon completion of training.

Figure 4:
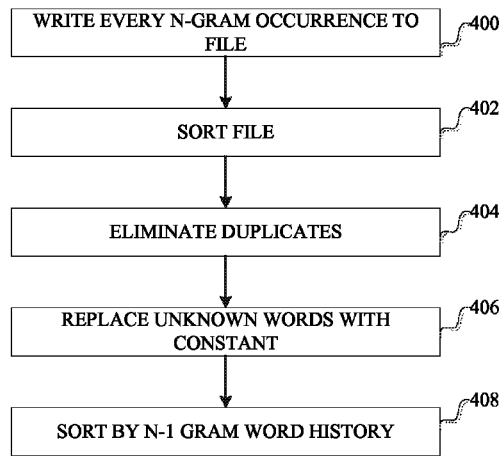
FIG. 4 is a flowchart describing an example implementation of sorting data for training.

One implementation for organizing the data, referring now to FIG. 4 is the following. First, every n-gram occurrence in the data set is written 400 to a data file or other structure allowing the n-grams to be sorted easily. The file is sorted 402, for example, by the first word in each n-gram. Duplicates are eliminated 404. Unknown words can be replaced 406 by a token or constant value, e.g. "<unk>", so as to normalize the dataset. This data can be further sorted 408 by n−1 gram word history. For example, for a set of n-grams to be sorted, the first n−1 words in each n-gram are used as the key for sorting, so that n-grams that share the same first n−1 words are always grouped together. If there is a tie in the sorting, n-grams that share the same first n−1 words can be further sorted by the class of the n-th word, as an example way to break the tie. This implementation is merely one way of sorting the data and the invention is not limited to this implementation. A variety of sorting techniques can be implemented, examples of which are described in Wu and Khudanpur, "Efficient Training Methods for Maximum Entropy Language Modeling," in ICSLP 2000.

In the training process, word normalization involves substantial computation. Most word pairs never occur, and this fact can be used to reduce the computation to an amount proportional to the number of bigram successors of the second to last word. Thus, Recall that $\lambda_{w_{i-2}w_{i-1}w'}$ and $\lambda_{w_{i-1}w'}$ only exist for n-grams that occur in the training data. Thus if $\text{succs}(c_i, w_{i\,1})$ is defined to the words in class $c_i$ that have been seen following we may write (with the three addends being Equations (4), (5) and (6), in order from left to right):

$$\sum_{w' \in c_i} \exp(\lambda_{w_{i-2}w_{i-1}w'} + \lambda_{w_{i-1}w'} + \lambda_{w'}) = \sum_{w' \in c_i} \exp(\lambda_{w'}) + \sum_{w' \in \text{succs}(c_i, w_{i-1})} \exp(\lambda_{w_{i-2}w_{i-1}w'} + \lambda_{w_{i-1}w'} + \lambda_{w'}) - \sum_{w' \in \text{succs}(c_i, w_{i-1})} \exp(\lambda_{w'})$$

Equation (4) is thus computed once per class, after each round of parameter re-estimation. Equations (5) and (6) are computed on demand on only involve considering the bigram successors of the second-to-last word.

Additionally, training a class-based exponential language model such as Model M involves implementing L1 and L2 regularization. In this implementation, the R-prop gradient descent method, described in M. Reidmiller, "RProp—Description and Implementation Details," University of Karlsruhe Tech. Report, 1994, works efficiently.

Figure 5:
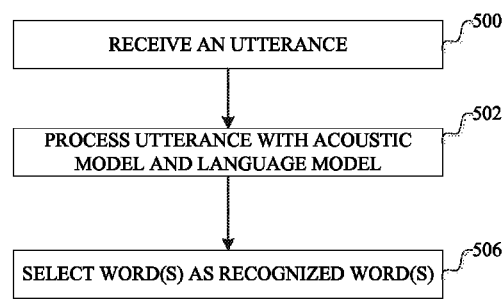
FIG. 5 is a flowchart describing an example implementation of a voice recognition process
Figure 6:
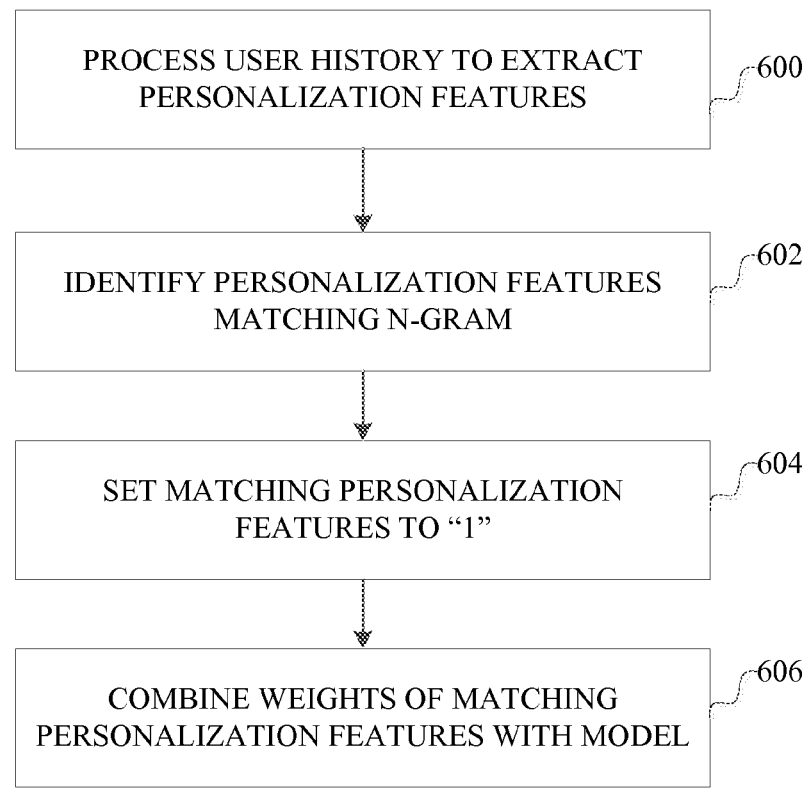
FIG. 6 is a flowchart describing an example implementation of a personalizing a language model using user history.

Turning now to the recognition process using a trained model, FIG. 5 is a flowchart describing recognition. First, the voice recognitions system (e.g., 112 in FIG. 1) receives 500 the utterance. The voice recognition system processes 502 the speech using an acoustic model for decoding and the language model modified by the user history. A word or set of words is then selected 506 as the recognized word or set of words. This information is stored 508 in the user history (e.g., history data 120 in FIG. 1).

The process of recognizing a word using a user history involves processing 600 the user history to extract a set of personalization features. For example, if a user's history includes "Triple Door Lounge" and "The Century Ballroom", then word features include "Triple Door", "Door", "Century Ballroom", "Century", and class features include "Article Adjective Noun." Each standard feature of the language model is associated with an additional feature of value "1" if the standard feature is in the set of personalization features. A weight is associated with each personalization feature. All n-grams of the same length have the same weight. Separate weights are used for word and class features, which allows the more specific word features to be weighted differently from less specific class features. More weights provide more degrees of freedom in the model, thus potentially increasing modeling power, but also increasing training complexity. Separating weights for words and classes is effective in increasing the modeling power while increasing the number of weights minimally. The values of the weights are typically between −10 and 10, although there are no restrictions in practice. Thus, the user history is transformed into a set of personalization features, each with a weight. A personalization feature can also be derived from words in the user history and other information. For example, a feature can be derived by combining a user's location with a user history and other words. The words associated with a user location can be used. For example, a feature can be a log of a ratio of a word's frequency in the user's locality to its overall frequency in a corpus of documents.

Given an n-gram, each personalization feature of which it is a stem is then identified 602. All of these personalization features that match are set 604 to a value of "1". The weights corresponding to these features have been preset and are known. The weights for the personalization features set to "1" are combined 606 with the model to provide the final probability for the given n-gram. Equations 2 and 3 now become Equation 7:

$$P(w_3 \mid w_1 w_2, h) = P(c_3 \mid c_1 c_2, w_1 w_2, h) P(w_3 \mid w_1 w_2, c_3, h)$$

$$P(c_3 \mid c_1 c_2, w_1 w_2, h) =$$
$$\frac{1}{Z} \exp(\lambda_{c_1 c_2 c_3} + \lambda_{c_2 c_3} + \lambda_{c_3} + \lambda_{w_1 w_2 c_3} + \lambda_{w_2 c_3} + \lambda^p_{c_1 c_2 c_3} +$$
$$\lambda^p_{c_2 c_3} + \lambda^p_{c_3} + \lambda^p_{w_1 w_2 c_3} + \lambda^p_{w_2 c_3})$$

$$P(w_3 \mid w_1 w_2, c_3) = \frac{1}{Z} \exp(\lambda_{w_1 w_2 w_3} + \lambda_{w_2 w_3} + \lambda_{w_3} + \lambda^p_{w_1 w_2 w_3} + \lambda^p_{w_2 w_3} + \lambda^p_{w_3})$$

where h is the user's history, Z is the normalization constant (analogous to the denominators in Eq'ns. 2 and 3), and $\lambda^p$ is the weight associated with seeing the corresponding feature in the history. This weight is tied across features, meaning all features of the same length, e.g., all one-word features, have the same weight, as described above.

Using these techniques, user history can be efficiently used to personalize a language model without retraining the model. The model can be updated dynamically during use, on a per-user, per-utterance basis.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multipro- cessor systems, microprocessor-based systems, set top boxes, game consoles, programmable consumer electronics, network PCs, minicomputers, mainframe computers, distributed computing environments that include any of the above systems or devices, and the like.

Figure 7:
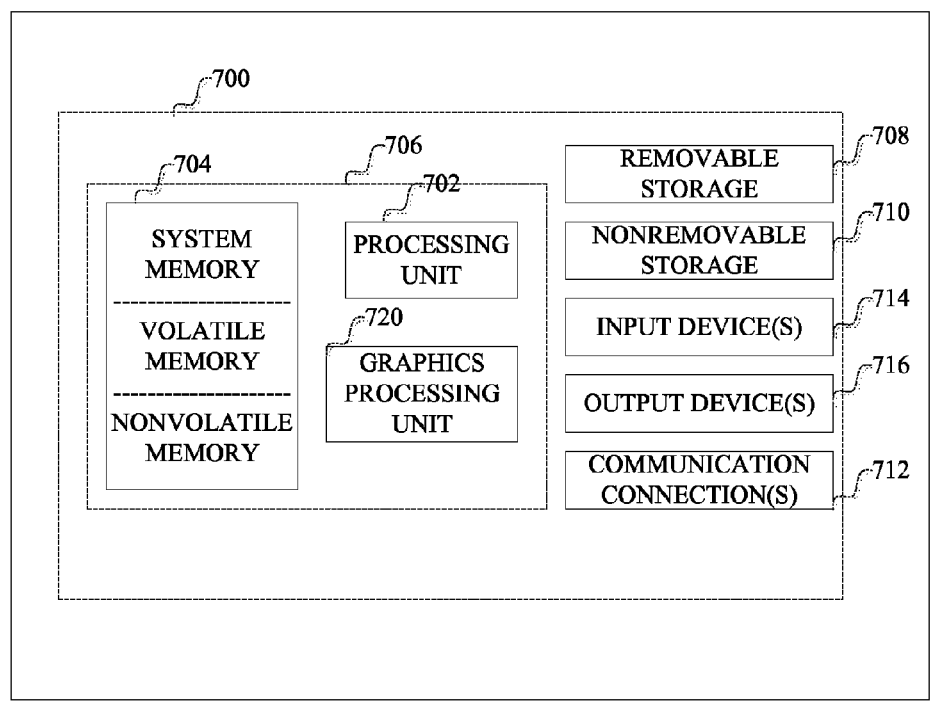
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a display, a keyboard, mouse, pen, camera, touch input device, and so on. Output device(s) 716 such as speakers, a printer, and so on may also be included. All of these devices are well known in the art and need not be discussed at length here.

The training of the language model, and its use in voice recognition, can be implemented in the general context of software, including computer-executable instructions and/or computer-interpreted instructions, such as program modules, being processed by a computing machine. Different computer systems can be used for training and recognition. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer system for voice search comprising:
first storage in which data defining an exponential language model are stored for use for a plurality of users;
second storage in which data defining user histories are stored, with a user history for each user of the plurality of users, the user history for each user storing data describing utterances processed for the user; and
one or more processing devices connected to access the first storage and the second storage, and in communication with a plurality of user devices to receive and process utterances received from the plurality of users through the plurality of user devices, each of the received utterances being provided by a user of the plurality of users, the one or more processing devices configured to:
for each user of the plurality of users, define personalization features for the user from the user history of the user in the second storage, the personalization features corresponding to features in the exponential language model; and
for each of the received utterances:
process the utterance using both the features in the exponential language model from the first storage and the personalization features defined from the user history of the user providing the utterance to identify words in the utterance;
provide search results using the words identified in the utterance to the user device from which the utterance was received; and
update, in the second storage, the user history of the user providing the utterance based on the utterance received from the user.

2. The computer system of claim 1, wherein the one or more processing devices is further configured to continually update the user histories of each user in the second storage according to utterances from each user processed by the processing device and to update the personalization features for each user based on the updated user histories in the second storage.

3. The computer system of claim 1, wherein personalization features of a same size have a same weight.

4. The computer system of claim 1, wherein the personalization features include word based features including words from the user history.

5. The computer system of claim 1, wherein the personalization features include class based features including classes of words from the user history.

6. The computer system of claim 1, wherein the personalization features include features with both words and class information.

7. The computer system of claim 1, wherein the personalization features include information derived from a locality of the user and words associated with the locality.

8. A computer-implemented process, comprising:
   maintaining in a first storage accessible by one or more server computers data defining an exponential language model for use for a plurality of users;
   maintaining in a second storage accessible by the one or more server computers data defining user histories, with a user history for each user of the plurality of users, the user history for each user storing data describing utterances processed for the user;
   establishing communication between the one or more server computers and a plurality of user devices associated with the plurality of users, to enable the server computers to receive and process utterances received from the plurality of users through the plurality of user devices, each of the received utterances being provided by a user of the plurality of users;
   the one or more server computers defining, for each of the plurality of users, personalization features for the user from the user history of the user in the second storage, the personalization features corresponding to features in the exponential language model; and
   in response to each of the utterances received by the one or more server computers from any user of the plurality of users, the one or more server computers:
      processing the utterance using both the features in the exponential language model from the first storage and the personalization features defined from the user history of the user providing the utterance to identify words in the utterance;
      providing search results using the words identified in the utterance to the user device from which the utterance was received; and
      updating, in the second storage, the user history of the user providing the utterance in based on the utterance received from the user.

9. The computer implemented process of claim 8, further comprising continually updating the user histories of each user in the second storage according to utterances from each user processed by the one or more server computers and to update the personalization features for each user based on the updated user histories in the second storage.

10. The computer implemented process of claim 8, wherein personalization features of a same size have a same weight.

11. The computer implemented process of claim 8, wherein the personalization features include word based features including words from the user history.

12. The computer implemented process of claim 8, wherein the personalization features include class based features including classes of words from the user history.

13. The computer implemented process of claim 8, wherein the personalization features include features with both words and class information.

14. The computer implemented process of claim 8, wherein the personalization features include information derived from a locality of the user and words associated with the locality.

15. An article of manufacture, comprising:
   a computer-readable storage medium;
   computer program instructions encoded on the computer-readable storage medium that, when processed by a computer, instruct the computer to perform a process comprising:
   maintaining, in a first storage accessible by the computer, data defining an exponential language model for use for a plurality of users;
   maintaining, in a second storage accessible by the computer, data defining user histories, with a user history for each user of the plurality of users, the user history for each user storing data describing utterances processed for the user;
   enabling the computer to receive utterances from a plurality of user devices associated with the plurality of users;
   the computer defining, for each user of the plurality of users, personalization features for the user from the user history of the user in the second storage, the personalization features corresponding to features in the exponential language model; and
   for each of the received utterances:
      processing the utterance using both the features in the exponential language model from the first storage and the personalization features defined from the user history of the user providing the utterance to identify words in the utterance;
      providing search results using the words identified in the utterance to the user device from which the utterance was received; and
      updating, in the second storage, the user history of the user providing the utterance based on the utterance received from the user.

16. The article of manufacture of claim 15, wherein the process further comprises continually updating the user histories of each user in the second storage according to utterances from each user processed by the processing device and to update the personalization features for each user based on the updated user histories in the second storage.

17. The article of manufacture of claim 15, wherein personalization features of a same size have a same weight.

18. The article of manufacture of claim 15, wherein the personalization features include word based features including words from the user history.

19. The article of manufacture of claim 15, wherein the personalization features include class based features including classes of words from the user history.

20. The article of manufacture of claim 15, wherein the personalization features include features with both words and class information.

* * * * *